Jan. 28, 1969
G. E. BARKER
3,424,951
ELECTRICAL CONTROL VALVE
Filed Nov. 23, 1964
Sheet _1_ of 4
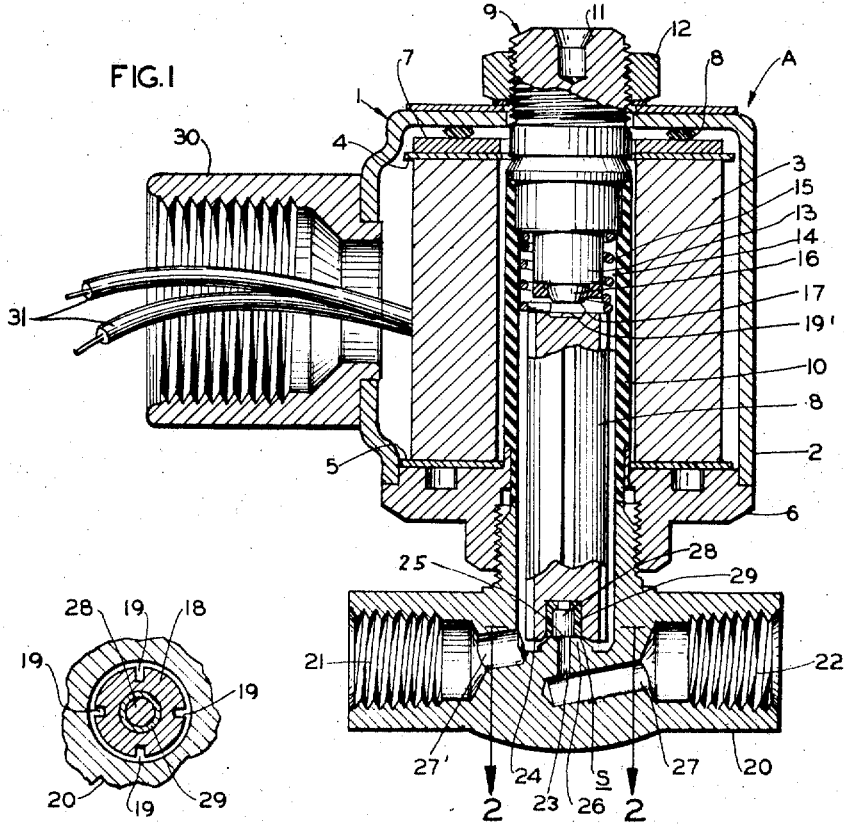
FIG. 1
FIG. 2
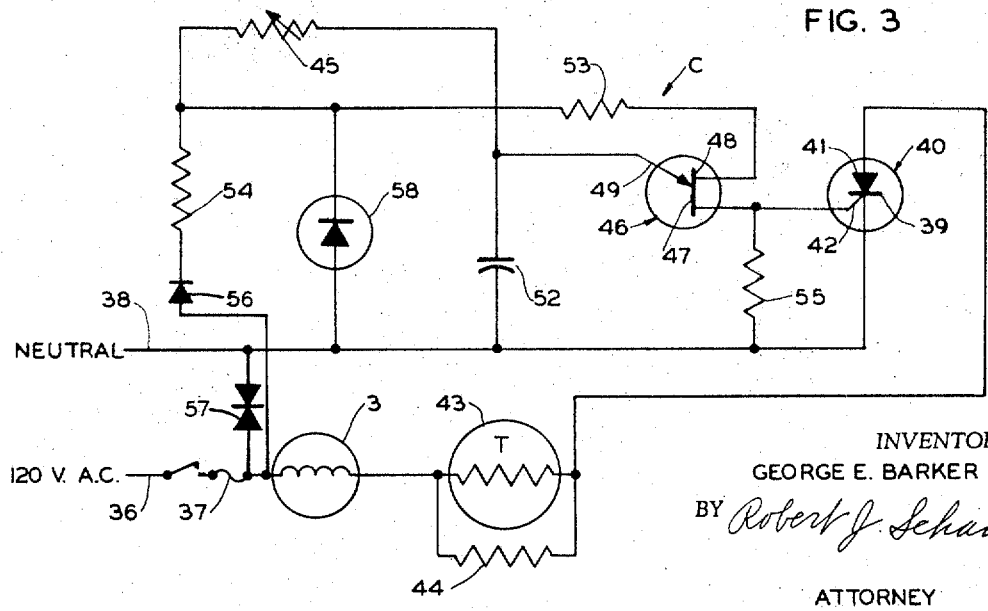
FIG. 3
INVENTOR.
GEORGE E. BARKER
BY Robert J. Schaap
ATTORNEY

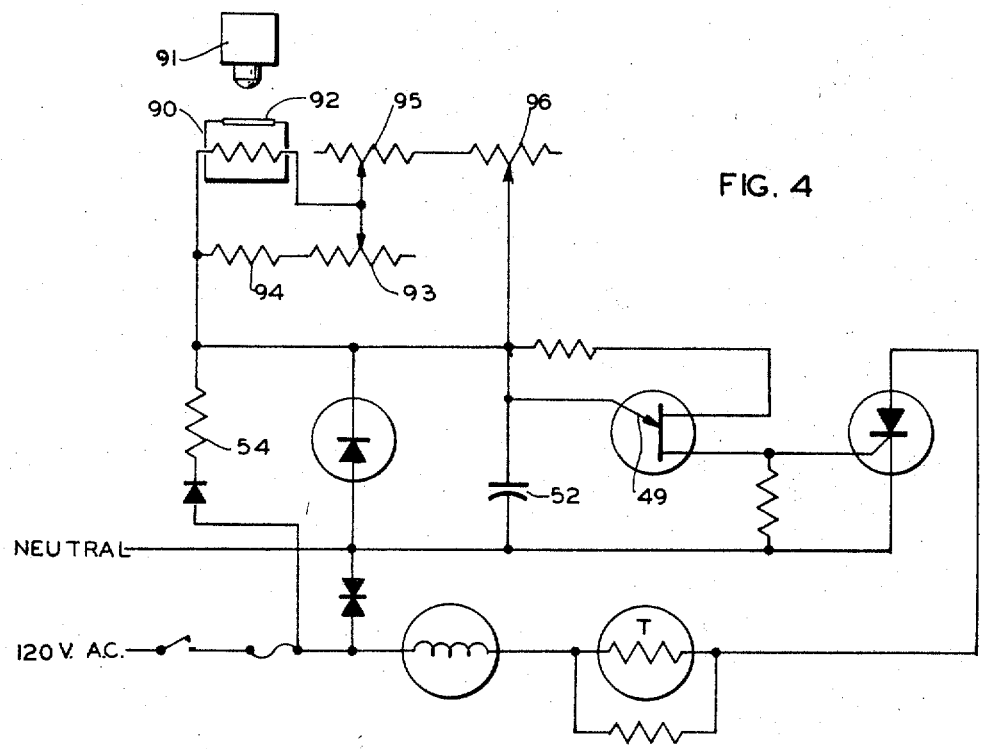
FIG. 4
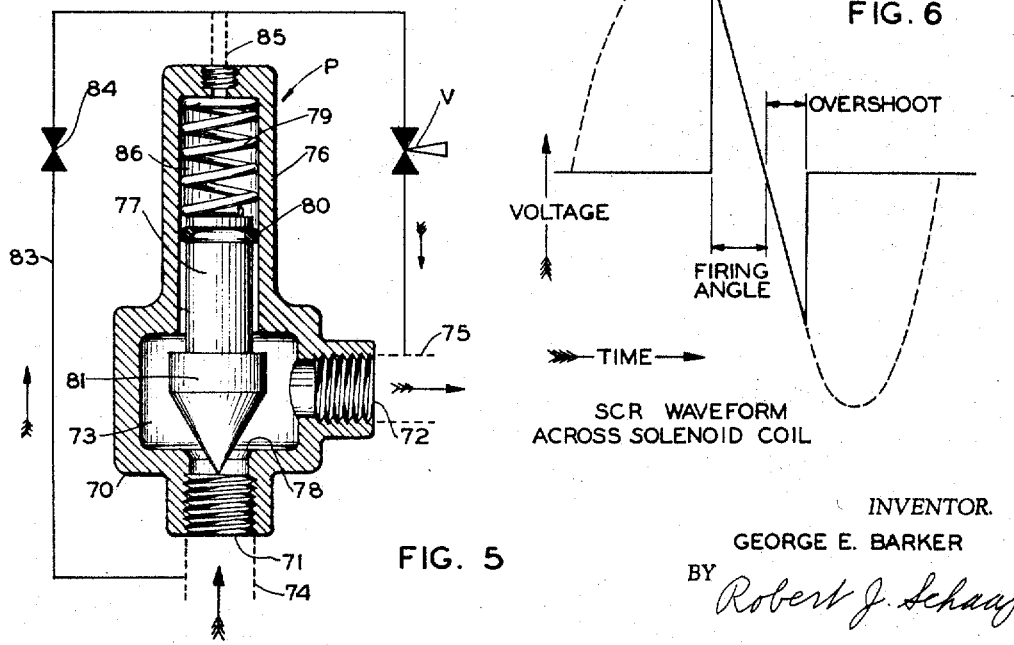
FIG. 5
FIG. 6
SCR WAVEFORM
ACROSS SOLENOID COIL
INVENTOR.
GEORGE E. BARKER
BY Robert J. Schaap
ATTORNEY

LIQUID LEVEL
CONTROLER CHACTERISTICS

FLOW RATE
VS
FIRING ANGLE

INVENTOR.
GEORGE E. BARKER
BY Robert J. Schaap
ATTORNEY

United States Patent Office 3,424,951
Patented Jan. 28, 1969

3,424,951
ELECTRICAL CONTROL VALVE
George E. Barker, St. Louis, Mo., assignor to Monsanto Company, St. Louis, Mo., a corporation of Delaware
Filed Nov. 23, 1964, Ser. No. 412,921
U.S. Cl. 317—123        7 Claims
Int. Cl. H01h 47/02

ABSTRACT OF THE DISCLOSURE

A dithering solenoid valve where the amplitude of vibration of the valve plunger is controlled by adjusting the firing angle of a pulse to the solenoid. The pulses are sufficiently short so that the valve plunger never engages the upper position. Furthermore, a quiescent period is maintained between each of the force pulses which is sufficient to enable the valve plunger to contact the valve seat before application of the next force pulse. A liquid level controller and fluid pressure controller employing the valve are also disclosed.

---

This invention relates in general to certain new and useful improvements in control valves, and more particularly to an electrically operated valve control system which is capable of modulating action.

Recently, the use of electronic instrumentation has grown steadily in the chemical processing industries. Today, it is not uncommon to find entire chemical processing plants which are provided with the necessary instrumentation for a complete electrical control. In fact, there have been many recent discoveries of instrumentation which are capable of process sensing and generation of control signals. A wide variety of process sensing and control generation instruments of this type are readily available and are adaptable to a multitude of applications.

However, the final control element, such as a modulating flow control valve, has not kept pace with the advancements in instrumentation for electrical control and generally is still pneumatically operated, such as the typical air-motor valve. Pneumatically operated control valves such as the air-motor control valve was a logical development in chemical processing instrumentation of the past, since many of the sensors used in processing equipment generated pneumatic pressure signals directly. Consequently, the air-motor control valve and similar devices filled a direct need. However, the presently available pneumatically operated control elements are not suitable for high response instrumentation required in modern automatic process control.

The recent developments in sensory equipment and control signal equipment for chemical processes require a fast-response control device. It is difficult to achieve a fast-response device with long pneumatic transfer lines associated with pneumatically operated control elements such as the conventional air-operated control valves. Although many manufacturers have attempted to produce a completely electric control valve, the valves thus far produced have not been completely successful. The existing electric control valves are generally constructed with an electric motor substituted for the air-motor and are, therefore, relatively expensive. Moreover, electric valves of this type are relatively slow in response compared to the rapid signals achieved by the recent sensory and control signal equipment. Furthermore, such valves are difficult to make "fail-safe" in the event of a power failure.

Aside from the above, the other performance specifications for control valves and similar position control systems have become increasingly stringent, as the means realizing such systems have become increasingly complicated. In view of the limitations of pneumatic systems, the presently available control elements do not have a wide dynamic range and have a relatively low response speed. Furthermore, these control elements are characterized by a lack of precision and a relatively high inherent hysteresis, which affects the efficiency of the control elements.

It is, therefore, the primary object of the present invention to provide an electrically operable control system which is capable of controlling flow over a wide dynamic range.

It is another object of the present invention to provide an electrically operable control system of the type stated which is relatively simple in its operation and has a long operating life.

It is a further object of the present invention to provide a specific control valve for use with the above mentioned control system which eliminates the need for a stuffing box and its inherent hysteresis.

It is an additional object of the present invention to provide an electrically operable control system of the type stated which can be used in both low pressure and high pressure fluid systems.

It is another salient object of the present invention to provide an electrically operable control system of the type stated which is adaptable for use in bench-scale equipment, pilot-plant equipment and commercial process equipment.

It is still another object of the present invention to provide an electrically operable control system of the type stated which can be built into a small compact unit, which is relatively inexpensive to manufacture and has a high degree of reliability.

With the above and other objects in view, my invention resides in the novel features of form, construction, arrangement, and combination of parts presently described and pointed out in the claims.

In the accompanying drawings:

FIGURE 1 is a vertical sectional view, partially broken away, of an electrically operated control valve constructed in accordance with and embodying the present invention;

FIGURE 2 is a fragmentary sectional view taken along line 2—2 of FIGURE 1;

FIGURE 3 is a diagrammatic view of a control circuit used with the electrically operated control valve of FIGURE 1;

FIGURE 4 is a diagrammatic view of a control circuit to be used with the electrically operated control valve of FIGURE 1, when the latter is used as a liquid level controller;

FIGURE 5 is a schematic view, partially in section, of a plant-scale valve, which employs the electrically operated control valve of FIGURE 1 as a pilot control valve;

FIGURE 6 is a diagrammatical view of a voltage wave form applied to the control circuit of FIGURE 3 and the wave form of the control pulse thus produced;

Figure 7:
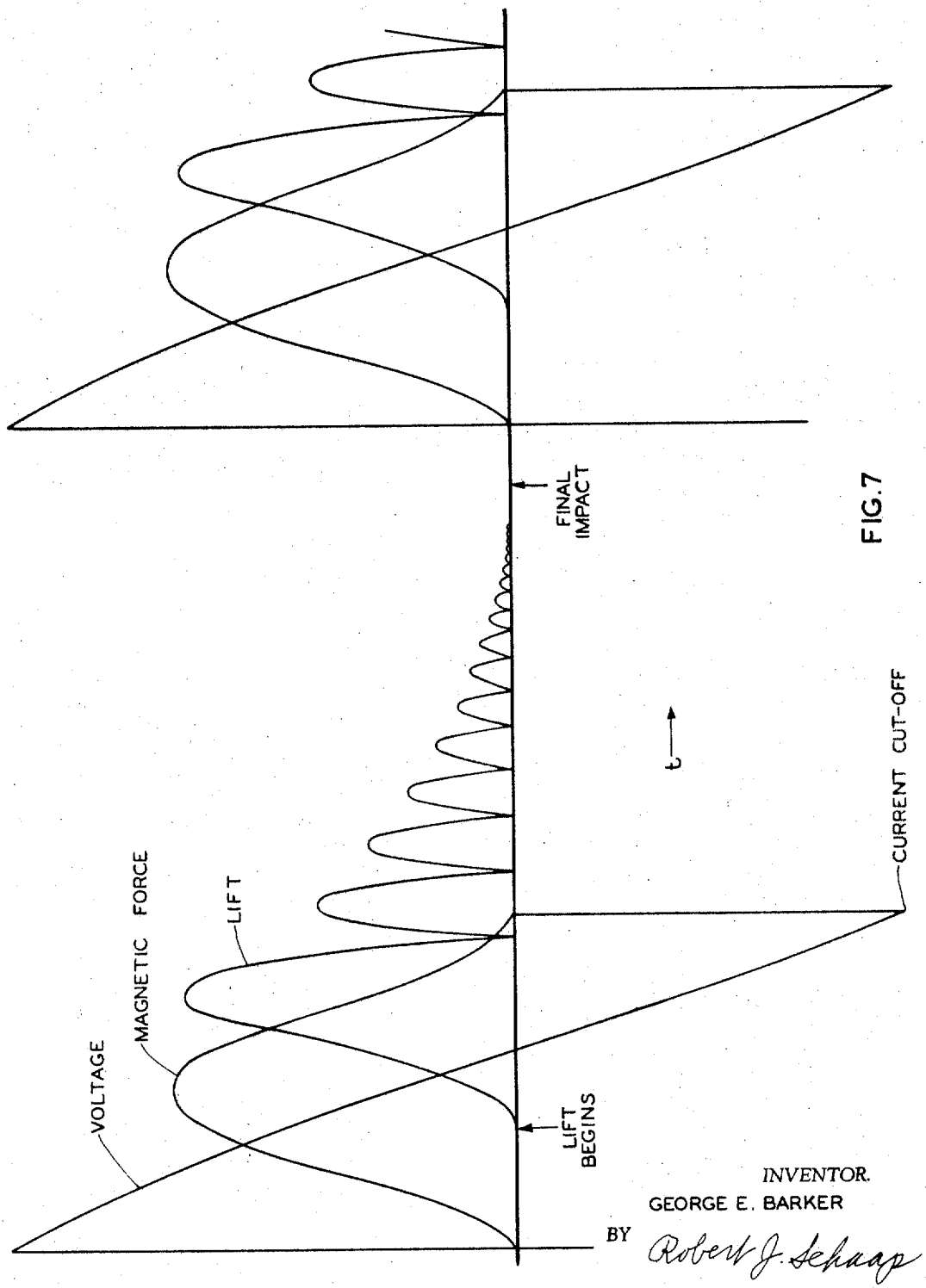
FIGURE 7 is a diagrammatical view of the pulse voltage wave form applied to the solenoid coil in timed relation to the magnetic force produced by the solenoid, and in timed relation to the wave form showing vibration of the valve plunger.
Figure 9:
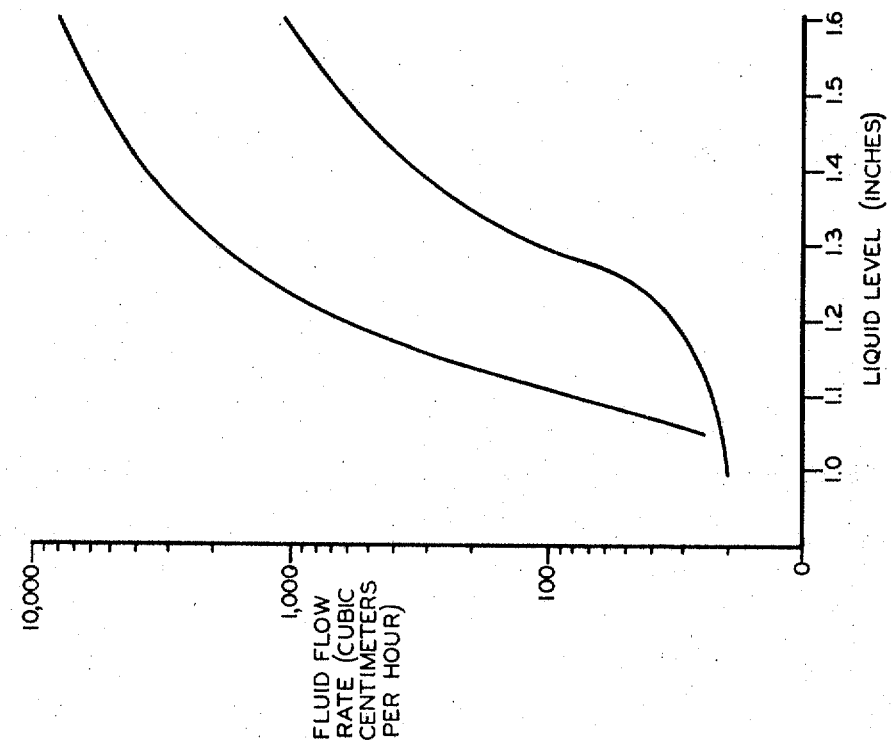
FIGURE 9 is a chart showing liquid level control characteristics of the valve of FIGURE 1, and illustrates the flow rate as a function of liquid level.

Generally speaking, the present invention resides in an electrically operable control valve which is capable of modulating control action by varying the voltage supplied to the coil of the control valve. The valve is designed to control fluid flow in response to changes of a measured physical variable, such as liquid level. Consequently, the electrically operable control valve can find a wide variety of uses, such as a liquid level controller, a differential pressure controller or a temperature controller. The valve is provided with inlet and outlet ports, the outlet port having a valve seat. A vibratory plunger shifts with respect to the valve seat for controlling the flow of fluid through the valve housing. The valve plunger is metallic and actuable by a solenoid coil which is associated with the valve housing and surrounds the plunger.

A control circuit is provided for measuring the changes in the measured physical variable. The control circuit generally includes a sensor for measuring the change of the sensed physical variable and a mechanism for converting the measured physical property change into a proportional resistance change. The control circuit also includes a relaxation oscillator which is designed to convert the proportional resistance change into a sequence of timed pulses. Finally, a silicon controlled rectifier is provided for transmitting current pulses in timed relationship to the solenoid coil for actuating the plunger. In effect, it is thereby possible to maintain controlled vibration of the plunger for regulating fluid flow in proportion to the change of the sensed physical variable.

The explanation of this flow control phenomenon involves a rather new control principle, namely, controlled mechanical vibration of the plunger at line frequency. This mechanical vibration is a forced vibration caused by the pulsating force exerted on the plunger by the solenoid coil. During the pulse cycle, the force exerted on the plunger starts from a zero level, reaches a maximum level, and returns to a zero level. If the average force exerted on the plunger by this pulsating voltage application is equal to or greater than the spring force which is designed to hold the plunger in a closed position, the plunger will snap open in a conventional solenoid-valve fashion. If however, the average force exerted on the plunger by the coil is less than the spring force, but the maximum force is greater than the spring force, then the plunger will be lifted from the valve seat during a portion of the pulse cycle. During the lift portion of the cycle, the motion of the plunger can then be described by conventional force-mass differential equations. The effective valve opening can then be conveniently described by the time integral of the vertical lift of the plunger.

Referring now in more detail and by reference characters to the drawings which illustrate practical embodiments of the present invention, A designates an electrically operated solenoid control valve substantially as shown in FIGURES 1 and 2. The control valve A is operatively connected to and operable by a control circuit C, substantially as shown in FIGURE 3. The control valve A and the control circuit C are hereinafter described in more detail.

Control valve

The control valve A generally comprises an outer control valve housing 1 including a somewhat cylindrical coil housing 2. Disposed within the housing 2 is a helically wound cylindrical solenoid coil 3 and disposed upon opposite ends thereof are upper and lower insulating washers 4 and 5, respectively. The insulating washer 5 is facewise disposed upon the upper surface of a base plate 6 which forms part of the outer coil housing 2. Facewise disposed upon the upper insulating washer 4 is a circular flux plate 7. The assembly of the solenoid coil 3, the insulating washers 4, 5 and the flux plate 7 is suitably held in place and urged downwardly toward the base plate 6 by means of a set of flat springs 8. By reference to FIGURE 1, it can be seen that the springs 8 are interposed between the upper surface of the flux plate 7 and the undersurface of the top wall forming part of the coil housing 2.

The coil housing 2 and the solenoid coil 3 are centrally apertured to accommodate a plunger tube assembly 9 which comprises a cylindrical tube 10 disposed axially within the coil housing 2 and which contains a central nonmagnetic section surrounded by magnetic sections at each transverse end. Secured to the upper end of the tube 10 is a plug 11 which is retained by a nut 12, substantially as shown in FIGURE 1. The plug 11 projects inwardly into the tube 10 and at its lower end, is diametrally reduced in the provision of a downwardly extending boss 13, thereby providing an annular relief 14 for accommodating a compression spring 15. Integrally formed with and extending downwardly from the lower end of the boss 13 is a projection 16, the lower face of which serves as a plunger stop 17. Reciprocatively disposed within the tube 10 and being adapted for vibratory movement is a valve plunger 18 which is provided with four circumferentially spaced axially extending fluid ducts or reliefs 19. At its upper end, the plunger 18 is milled to provide a plunger head 19'.

Threadedly secured to the lower end of the base plate 6 is a valve body 20 which is axially drilled from each of its transverse ends to form inlet and outlet ports 21, 22 respectively. The valve body 20 is also provided with a duct 23 communicating with a fluid chamber 24 formed by the tube 10. Communication is provided therebetween by an orifice 25 formed in an upstanding boss 26 integrally formed with the valve body 20. The fluid chamber 24 communicates with the outlet port 22 through an axial duct 27 which, in turn, communicates with the axial duct 23. The inlet port 21 is maintained in communication with the chamber 24 through an axial duct 27' formed in the valve body 20, substantially as shown in FIGURE 1. The upstanding boss 26 is machined with a flat head so that it suitably serves as a valve seat $s$.

The valve plunger 18 is internally bored from its bottom face to accommodate a disc 28 formed of a tetrafluoroethylene polymer marketed under the trade name "Teflon," and which is surrounded by a stainless steel ring 29. The seat material, such as the Teflon, has a strong effect on secondary or rebound vibrations of a vibrating plunger. In general, the secondary vibrations are undesirable inasmuch as they adversely affect the stability of the valve. Moreover, much of the noise associated with pulsed solenoid operation is produced by secondary or rebound vibrations. In connection with the present invention, it was found that a seat formed of Teflon produced the most desirable results of any material analyzed. Teflon possessed a high elastic co-efficient but which was sufficient for an adequately stable range of operation. The rebound vibrations were sufficiently negligible and it was found that the valve seat $S$ had a rather extended life. A detailed comparison of Teflon with other materials used as a valve seat is set forth hereinbelow.

Improved stability is also achieved by preventing repeatable and uncontrollable radial vibrations of the plunger 18. This can be accomplished by wrapping the upper end of the plunger with Teflon tape. Preferably, a tab (not shown) can be silver soldered on the valve body so that the tab keys into one of the reliefs or grooves 19 of the plunger 18. The groove, of course, is marked so that the plunger 18 may always be reassembled in the same position. This type of construction eliminates the effect of slight non-concentricity of the plunger 18 with the orifice 25 so that the orifice indentation on the seat $s$ is always in the same radial orientation.

The valve A is also provided with a fitting 30 for accommodating a pair of leads 31 to the solenoid coil 3, in the manner as shown in FIGURE 1. The leads 31 are ultimately connected to the control circuit C in FIGURE 3 in a manner to be hereinafter described in detail.

Control circuit

The control circuit C as schematically shown in FIGURE 3 is powered from a 120 volt source of alternating electrical current (not shown) and includes a positive conductor 36 which is connected through a fuse 37 to the solenoid coil 3. The circuit C also includes a neutral conductor 38 which is connected to the cathode electrode 39 of a silicon controlled rectifier 40, the latter also including an anode electrode 41 and a gate electrode 42. The anode electrode 41 of the silicon controlled rectifier 40 is electrically connected through a thermistor 43 to the opposite terminal of the solenoid coil 3, substantially as shown in FIGURE 3. A fixed resistor 44 is shunted across the thermistor 43 for elimination of undesirable temperature effects.

The firing angle of the basic voltage output of the control circuit C to the solenoid 3 is, of course, controlled by measured changes in the sensed physical variable, which is schematically illustrated by a variable resistor or so-called "control resistor" 45 in FIGURE 3.

The basic timing device that controls the firing angle of the circuit in relation to the measured change in the physical variable is a unijunction transistor 46 which is used as a relaxation oscillator. The unijunction transistor 46 is provided with a base-1 47, a base-2 48 and an emitter 49. The emitter 49 can be connected directly to the variable resistor 45 and is also connected to a capacitor 52, which is in turn connected to the neutral conductor 38. The base-2 48 of the transistor 46 is connected through a temperature compensating resistor 53 to a limiting resistor 54 and to the opposite terminal of the variable resistor 45. The base-1 47 of the transistor 46 is electrically connected to the gate electrode 42 of the silicon controlled rectifier 40 and to a fixed resistor 55 which is in turn connected to the neutral conductor 38. The limiting resistor 54 is also connected to the cathode portion of a diode 56 and to the conductor 36. A surge suppressor 57 is connected across the conductors 36, 38 for suppression of transient voltage. A Zener diode 58 is also connected across one terminal of the resistor 53 and the neutral conductor 38, in the manner as schematically illustrated in FIGURE 3.

*Operation of the control circuit*

In order to described the operation of the control circuit, it must be recognized that the control resistor 45 is representative of the function which is being measured. It should therefore be understood that the resistor 45 can be conveniently replaced by a suitable sensory mechanism for measuring the changes of a physical variable which is capable of being converted into resistance changes, such as for example, a change in liquid level for level controlling and a change in temperature for temperature controlling. For example, if it were desired to convert the control circuit of FIGURE 2 into a liquid level controller, the circuit would be modified as shown in FIGURE 4 and which is hereinafter more fully described in detail. Consequently, it can be seen that the basic firing angle of the output voltage to the solenoid 3 is controlled by the changes in the sensed physical variable. Inasmuch as the sensed change of the physical variable is capable of being translated to an electrical change, such as a voltage, current or resistance change, this change can be physically represented by the variable resistor 45.

The unijunction transistor 46 which serves as the relaxation oscillator delivers a current pulse into the gate of the silicon controlled rectifier 40 at a controllable time within the positive cycle of the supply voltage from the source of electrical current. This current pulse is delivered to the gate electrode 42 of the silicon controlled rectifier 40 from the base-1 47 of the unijunction transistor 46. When the rectifier 40 receives this signal it will begin to conduct and will continue to conduct until the current attempts to reverse, at which time conventional dide action stops the current flow. From the above outlined construction, it can be seen that during the negative cycle no action will take place. The operation of the relaxation oscillator uses the principle of the unijunction transistor 46 that conduction between the emitter 49 and base-1 47 is prevented unless the emitter to base-1 voltage is greater than a critical value, that critical value being determined by the base-2 voltage to the base-1 voltage. When this peak voltage is exceeded, the effective resistance between the emitter 49 and the base-1 47 drops and approaches a zero level. Conduction will continue until the emitter to base-1 voltage drops below the valley point voltage.

The diode 56 serves as a half-wave rectifier and provides control voltage for the unijunction transistor 46. The control voltage from the half-wave rectifier 56 is reduced and clipped by the limiting resistor 54 and the Zener diode 58 to produce a square wave voltage form. This square wave control voltage produced by this half-wave rectifying circuit consisting of the diode 56, the resistor 54 and the Zener diode 58, is transmitted both to the emitter 49 and to the base-2 48 through the temperature compensating resistor 53. The capacitor 52 in conjunction with the control resistor 45 determines the firing time of the unijunction transistor 46 and synchronization with the supply of alternating current is obtained by feeding the base-2 48 with the same square wave signal. The charge on the capacitor 52 is initially zero and it will begin to charge by flow of current through the control resistor 45. From the above, it can be seen that the lower the value of the control resistor, the faster will be the charging rate, and hence the rate of voltage rise at the emitter 49 of the unijunction transistor 46. However, during the time of the voltage rise at the emitter 49, the voltage difference maintained between the base-1 47 and the base-2 48 will be constant. When the voltage at the emitter 49 reaches its critical value, the unijunction transistor 46 will fire, thereby discharging the capacitor 52 through the resistor 55, permitting current flow into the gate electrode 42 of the silicon controlled rectifier 40. This pulse of current into the gate electrode 42 will cause the silicon controlled rectifier 40 to fire and to begin supply of current to the "load," which consists of the solenoid coil 3. When the control resistance is larger than the critical value, the capacitor 52 will not have charged to the firing voltage by the end of a positive cycle. Although this type of synchronization causes the unijunction transistor 46 to fire, only a small voltage is developed across the "load" under these conditions. As the control resistance is decreased from the critical value, the unijunction transistor 46 will fire appreciably earlier than the end of the half cycle, thereby causing the silicon controlled rectifier 40 to conduct for increasingly larger angles. After the unijunction transistor 46 has fired, the capacitor 52 will immediately begin to recharge and, if the resistance is low enough, may fire again before the end of the half cycle. However, since the silicon controlled rectifier 40 will already be in the conducting state, this additional pulse caused by the firing of the capacitor 52 will have no effect.

FIGURE 6 illustrates the conversion of the sine wave provided by the source of alternating electrical current into the wave form transmitted from the silicon controlled rectifier to the solenoid coil 3. It can be seen that the basic voltage output of the controller is a half wave rectified sine-wave. It can also be seen that the wave form has a positive firing angle and a portion which constitutes an "overshoot" with respect to time, the overshoot having a negative voltage. Due to the inductance of the coil 3, a minimum firing angle exists below which the silicon controlled rectifier 40 will not conduct even though it obtains firing pulses from the unijunction transistor 46. This condition is caused by the slow build-up of current due to the inductance of the coil 3. If, by the end of the firing pulse, the current has not built up to a point where it is greater than the holding current of the silicon controlled rectifier 40, then conduction will cease. This phenomenon, however, presents no problem with the circuit of the present inventon, inasmuch as the minimum firing angle is below the value at which vibration begins.

After the silicon controlled rectifier 40 has fired, current will begin to flow in the solenoid coil 3 thereby generating magnetic flux which produces a force on the valve plunger 18. This increasing flux around the coil 3 also produces a back electromotive force which opposes the current flow into the coil 3. As the flux increases, the force on the plunger 18 increases until it balances the spring force holding the plunger 18 to the seated position, substantially as shown in FIGURE 1. At this instant, the plunger begins to move decreasing the air gap, that is the space between the plunger stop 17 and the plunger head 19' and further increases the flux around the coil 3. If a constant voltage were applied to the coil 3, this process would ultimately result in the plunger contacting the plunger stop 17. However, the voltage is reduced continually from the instant conduction has started where the firing angles are less than ninety degrees (90°). Thus, before the plunger 18 has reached the stop 17, the pull exerted by the solenoid coil 3 has been substantially reduced and eventually reaches a zero level, when the silicon controlled rectifier 40 stops conducting. By varying the firing angle of the silicon controlled rectifier 40, both the maximum force and the effective pulse width can be varied for causing changes of the effective valve openings.

*Plant-scale electrically operated control valve*

It is possible to provide a plant-scale electrically operated control valve P which employs the previously described control valve A and control circuit C, substantially as illustrated in FIGURE 5. The plant-scale electrically operable control valve P generally comprises a valve housing 70 having fluid ports 71, 72 which communicate with a large internal fluid chamber 73, the fluid ports 71, 72 being provided with inlet and outlet lines 74, 75 respectively. The valve housing 70 is integrally provided with an upstanding hollowed-out tube 76 for accommodating a valve plunger 77. The valve plunger 77 is biased toward a seat 78 formed by the inlet port 71, by means of a compression spring 79, which is interposed between the head portion of the plunger 77 and the underside of the tube 76, substantially as shown in FIGURE 5. The valve plunger 77 is preferably provided with a Teflon O ring seal 80. The valve plunger 77 is further provided with an enlarged plug 81 at its lower end. The plug 81 is tapered so that the area of the upper chamber hereinafter described is substantially equal to the area of the main valve seat. With this condition, downstream pressure variations do not affect the position of the main valve.

Connected between the inlet and outlet ports, substantially as shown in FIGURE 5 is a fluid control tube 83 which is provided with a fixed orifice 84 and a tube 85 which communicates with a chamber 86 formed by the head of the valve plunger 77, and the wall of the tube 76. Interposed in the fluid control tube 83 on the downstream side is the electrically operable control valve A and control circuit C which serves as a pilot control valve V. Thus, it can be seen that the pilot flow passes through a fixed orifice and the pressure existing between the fixed orifice 84 and the pilot valve V is applied to the upper dome or chamber 86 of the control valve P. The stem of the valve plunger 77 is exposed to this control pressure with isolation from the main stream arriving at the valve through the port 71, by means of the sliding O ring seal 80.

The operation of the pilot operated control valve P can be explained by analyzing the action of the valve P under open-loop control action since there will then be no feedback signal to the valve P. In this type of analyses, the valve P can be assumed to be a "let-down" valve. In the "let-down" valve, the upstream pressure is to be maintained constant and the downstream pressure is constant at a lower pressure than the upstream pressure. The open-loop control action can be explained by assuming that the upstream pressure which is constant, determines the flow through the main valve P as a function of the pilot control valve V flow. While it is not essential to the operation of the valve, it can be assumed for purposes of explanation that the area of the upper chamber, that is the area of the chamber 86 is equal to the cross-sectional area of the seat 78. Assuming this condition, the downstream pressure variations do not affect the position of the main valve plunger 77.

In operation, if the pilot valve V is closed, the spring 79 will hold the valve plunger 77 in closurewise position over the valve seat 78 since there will be no differential pressure force on the valve plunger 77. If however, a pilot flow is started through the pilot control valve V, in response to a change of a measured physical variable, the pressure drop across the fixed orifice 84 will result in a lower pressure being applied to the upper chamber 86. This differential pressure multiplied by the valve plunger cross-sectional area produces a net upward force on the valve plunger 77. When this upwardly exerted force equals the downwardly exerted force of the spring 79, the main valve plunger 77 will begin to lift from the seat 78 and permit flow through the main valve P. As pilot flow is further increased through the pilot valve V, in response to changes of a measured physical variable, the differential pressure force will be balanced by the increased spring force resulting from the greater valve lift. It can thus be seen that the plunger lift is proportional to the pilot flow rate through the pilot valve V minus the pilot rate when the main flow through the valve P commences. Thus, the pilot operated control valve V serves as an effective hydraulic amplifier. The pilot operated control valve V is also constructed with a built-in safety mechanism in that the valve plunger 77 will shift to its closed or seat position, substantially as shown in FIGURE 5 in the event of a power failure of the pilot valve control system. If it is desired to open the main control valve P in the event of power failure, it is only necessary to reverse the position of the fixed orifice 84 and the pilot control valve V.

In normal operation, the pilot control valve V will be given a signal which will control its average valve opening and hence fluid flow, so that pilot flow will be determined by the valve pressure drop, that is the pressure differential between upstream and downstream pressures, as well as by the series resistance of the fixed orifice 84 and the pilot valve V. Thus, as the pilot flow increases, the increased main flow through the valve P will reduce the available pilot flow pressure drop and consequently reduce the main flow through the valve P. This effect definitely tends to increase the stability of the system although it does place a finite upper limit on the flow rate through the main valve P. However, this does not present any problem inasmuch as the main valve P can be designed so that it will accommodate a maximum desired flow rate.

The pilot valve system described in FIGURE 5 has a wide degree of versatility and can be employed in a multitude of various control systems. For example, the pilot valve system of FIGURE 5 can be used to control the position of the main valve plunger 77 rather than by reaching a position determined by the interaction of main flow through the valve P and pilot flow through the valve V. This can be accomplished by modulating the pilot valve V to control the pilot flow using a differential pressure feed-back control loop. Variation of the main valve plunger lift would then be accomplished by changing the differential pressure control set point. This action is desirable where it is desired to maintain a fixed differential pressure across the main control valve P. Moreover, valve positioning action can be derived by measuring the position of the main control valve P and using a feedback loop to then control the main valve P. An iron rod can be attached to the main valve which is arranged to partly enter the coil would around the non-magnetic housing of the upper chamber. Thus, a change in valve position will cause a change in inductance of the coil, and this change can be used to generate a control signal for the pilot valve P. This type of positioning would be more desirable than the flow control method when dealing with compressible fluids where the volume of the upper chamber will produce a control lag.

This type of pilot operated control valve has a number of advantages over the conventional air-operated control valves in that it eliminates air or hydraulic transduction and in fact, the need for a plant air system. Moreover, this type of pilot operated control valve has an extremely high speed of response and a much lower operating cost than for conventional control systems. This type of control valve also eliminates the need for an external stuffing box with its inherent hysteresis. The plant-scale electrically operated control valve can be used in a multitude of applications with the same versatility as the electrically operated control valve which serves as the pilot valve V in the plant-scale control valve P. Thus, the plant-scale electrically operated control valve can be used as a liquid level controller, a differential pressure controller or a temperature controller.

From the above, it can be seen that the control valve A exhibits wide versatility and can be used in feedback control applications. By way of illustration but not limitation, the use of the controller A is exemplified by employment in a liquid level control application and a pressure control application.

Liquid level controller

The electrical control circuit C of FIGURE 3 was modified as schematically illustrated in FIGURE 4 to change the electrically operable control valve A into a liquid level controller. In this connection, it should be understood that a liquid level controller is only one of many applications of the electrically operable control valve. The electrically operabe control valve could be modified and employed as an absolute pressure control system, a differential pressure control system, a gauge pressure control system and a temperature controller, for example. In order to modify the control circuit C into that of a flow controller, it is only necessary to use a differential manometer with a suitable sensory mechanism. In order to provide a pressure controller, it is only necessary to replace the variable resistor 45 with a pressure transducer to give an equivalent resistance change. If it were desired to modify the control valve to make a temperature controller, it is only necessary to replace the variable resistor 45 with a suitable thermistor used as a sensor.

In order to modify the control circuit into a liquid level controller, the variable resistor 45 is replaced by a cadmium sulfide resistance type light sensitive transducer 90, often termed "sensor," which is used in conjunction with a light source 91 for sensing changes of liquid level within a tube 92. It is preferable though not necessary to employ a constant voltage transformer (not shown) as the source of electrical current. One terminal of the cadmium sulfide sensor 90 is connected to a proportional band potentiometer 93 which is in turn connected through a fixed resistor 94 to the common connection of the cadmium sulfide sensor 90 and the resistor 54, substantially as shown in FIGURE 4. This latter terminal of the sensor 90 is also connected in common to the movable element of a reset potentiometer 95 which is in turn connected to another reset potentiometer 96. By further reference to FIGURE 4, it can be seen that the movable element of the potentiometer is connected to the emitter 49 and the capacitor 52.

The actual sensing method of liquid level change was the refraction setting of a photocell, substantially as described in my copending application Ser. No. 323,383, filed Nov. 13, 1963 now U.S. Patent No. 3,311,834. The basic transducer is a cadmium sulfide photocell, the resistance of which decreases as light intensity increases. A collimated light source is directed perpendicular to the axis of the liquid level tube in a position off-center to the axis of the tube. The liquid in the tube has a higher index of refraction than the vapor phase and this causes the light beam to be refracted laterally when liquid is present. The cadmium sulfide receiver is mounted in a lateral position so that its light slit is illuminated when liquid is present and masked by the slit when vapor is present. While the liquid itself is used to provide change in light intensity by virtue of its refractive index, it should be understood that sensing by this method is equally efficient with clear or colored liquids.

The resistor 94 and potentiometer 93 shunt the cadmium sulfide sensor 90 and serve as proportional band adjustments. The potentiometer 95 provides course adjustment whereas the potentiometer 96 provides fine adjustment and serves as a method of resetting the flow rate. It has been found that liquid level controllers which embody the electrically operable control valve A are very stable. This type of liquid level controller shows considerable utility by the extreme versatility of the control circuit. Moreover, it is possible to generate proportional level control with a proportional band up to 0.5 inch by this method.

Pressure controller

The control valve A can also be modified for adaptation in a pressure control system. For pressure control operations, the cadmium sulfide photocell can be operatively connected to a pressure gauge (not shown) having a dial plate with conventional pressure graduations. The dial plate of the pressure gauge can be conveniently provided with an aperture in direct alignment with the photocell. A light source is then conveniently mounted in alignment with the photocell in the aperture. A control flag is secured to the indicator needle of the pressure gauge and is capable of being shifted to and away from closurewise position across the aperture. As the pressure in a measured variable function is increased, the control needle of the valve will be shifted carrying therewith the control flag. As the control flag shifts across the aperture to its closurewise position, the light incident upon the photocell is reduced. As the light upon the photocell is reduced, the current supplied to the relaxation oscillator is, therefore, reduced. Consequently, it can be seen that the signal received from the sensory transducer is related to the movement of the control flag and is hence related to the change of pressure.

Theory of operation

Pulsed solenoid control action can be explained by the theory that the plunger is made to vibrate on an orifice by magnetic force and that flow control results from controlling the amplitude of the vibrations. This concept therefore permits a quantitative description of the operable range of control. There are two major conditions which must exist under the theory that flow control results from controlled vibration of a plunger. The first condition is that the maximum magnetic force generated by the solenoid coil must be greater than the combined spring and gravity forces which holds the plunger against the valve seat. If this condition did not exist, then vibration of the plunger would be impossible. The second condition is that the magnetic force averaged over the power cycle must be less than the force exerted by the spring. If this did not exist, the plunger would be held against the upper stop for at least a portion of the cycle and the normal hysteresis and instability of conventional solenoid valves would then result. In actuality, the average force must be even less than the theoretical average force due to dynamic instability effects. This vibration concept also suggests that the effective valve area and hence the flow rate is proportional to the time integral of the valve lift over the power cycle.

The explanation of the wide dynamic range of the valve herein described lies in almost complete absence of friction, thereby permitting very low amplitude vibrations. Even though the plunger vibrates at least sixty times a second, long seat lift has been experienced as a result of low unbalanced forces on the plunger, so that the maximum seating pressure is well within the elastic range of the Teflon seat.

It is possible to develop an electromagnetic mathematical model and a dynamic mathematical model to explain the theory of operation of the pulsed solenoid control action.

In the solenoid valve, it can be considered that the flux is flowing upward through the plunger. Since the tube walls surrounding the plunger are made of a non-magnetic stainless steel, it can be assumed that all of the flux flows through the magnetic plunger as it enters the plunger through the fixed cylindrical air gap between the outer tube and the plunger. In general, solution of magnetic circuits of this type must be performed graphically due to the variation of iron permeability with flux density. If the iron circuit is well below magnetic saturation, most of the magnetomotive force of the coil is consumed by the air gaps and it is possible to lump all of the iron magnetomotive force drop into a single constant permeance. In this particular mathematical solution, it is possible to include the permeance of the fixed cylindrical air gap with the effective iron permeance, as most of the magnetomotive force drop was consumed in the iron. It can, therefore, be assumed that the magnetomotive force drop of the iron occurs uniformly along the length of the coil.

There are three main flux paths to consider in the analysis of the solenoid valve. The first of these flux paths is the main air-gap path. This includes the flux that crosses the upper air gap normal to the upper surface of the plunger. This flux also produces most of the useful pull of the magnet. The second of the flux paths to be considered is the radial leakage flux. This flux leaves the plunger along its length normal to the cylindrical surface, crosses the coil and returns to the plunger through the return iron circuit. Actually, there are two of such flux paths, one above and one below the main air gap. The lower flux path produces a useful vertical pull on the plunger, the so-called "solenoid pull." This pull arises from the interaction of the coil current with the radial leakage flux. The third of the flux paths to be considered is the fringing flux. This type of flux is defined as the flux that leaves the plunger near the air gap normal to the cylindrical surface of the plunger and enters the upper plunger stop normal to its cylindrical surface. In actuality, this flux, however, produces no vertical forces.

The pull of the main air gap flux ($F_g'$) in grams is given by the following relationship:

$$F_g' = 0.407 \times 10^{-4} \frac{\phi_g^2}{A} \quad (1)$$

where $\phi_g$ is the total flux in maxwells leaving the plunger normal to its upper surface area in square centimeters. The solenoid pull ($F_s'$) in grams is given by the following relationship:

$$F_s' = 2.59 \times 10^{-4} H \phi_s \quad (2)$$

where H is the field strength of the coil in ampere turns per centimeter and $\phi_s$ is the total radial leakage flux at the lower end of the plunger. When there is a change in flux linkages ($N\phi$) with time, a voltage is generated which tends to oppose this change. The magnitude of this opposing voltage ($E_b$) is given by the following relationship:

$$E_b = 10^{-8} \frac{d(N\phi)}{dT} \quad (3)$$

where the voltage is in absolute volts, the flux paths linkage in maxwell turns and the time in seconds. When the flux path in question links all of the turns in the coil, the number of turns, N, may be factored out of Equation 3. In the case of radial flux, however, the radial flux is distributed over a path of variable magneto-motive force and each individual flux path of the circuit links a different number of turns, from zero at the bottom of the path to $N/2$ at the air gap. It is now possible to calculate an equivalent permeance of the radial flux path that would produce the same flux linkage as the true case where all of the coil turns are used. In similar manner, it is possible to calculate an equivalent permeance for total radial flux assuming that the full coil magneto-motive force were the driving force. These equivalent permeances make it possible to lump the radial flux effects with the main gap effects.

It is possible to derive equations for the radial leakage effects by assuming that the air gap is located in the center of the coil length and that the air gap is small compared to the coil length. It is also possible to derive equations for the series permeance of the iron and cylindrical gap and in effect to derive formulas for the parallel resistance combination. It is also possible to relate flux linkages to inductance (I) as long as the iron is below the saturation level. By determining each of the aforementioned relationships, it is possible to calculate and derive a relationship for the vertical pull on the plunger which is the sum of the solenoid pull in grams ($F_s'$) and the force of the main air-gap flux ($F_g'$). The total vertical lift of the plunger can therefore be defined by the two following relationships $$F_g' = I^2 C_2 \left[ \frac{\frac{1}{g}}{\frac{1}{g} + C_4} \right]^2 \text{ (gms.)} \quad (4)$$

$$F_s' = I^2 \frac{C_5}{\left(C_4 + \frac{1}{g}\right)} \text{ (gms.)} \quad (5)$$

where $g$ is the effective air gap in centimeters $C_2$, $C_4$, and $C_5$ are group definitions defined below. The total vertical pull on the plunger is therefore represented by the sum of $F_g'$ and $F_s'$ $$L = C_1 \frac{\left(\frac{1}{g} + C_3\right)}{\left(C_4 + \frac{1}{g}\right)} \quad (6)$$

where L is the inductance in henrys, and $C_1$ and $C_3$ are group definitions defined below.

The magnetic circuit analysis presented above has produced an explicit formula for the magnetic force in terms of the instantaneous value of current and air gap. In order to complete the electromagnetic analysis, it is now necessary to determine how the current in the circuit varies with time. This can be readily accomplished by an application of Kirchoff's laws to the simple electrical model of the solenoid valve. By neglecting iron losses, the model consists of a resistance, $R_s$, in series with an inductance, L, and the combination placed across a voltage source, the value of which varies with time. The result of the Kirchoff law analysis states that the sum of the back electromotive force, $E_b$, of the coil plus the $IR_s$ drop through the resistance must equal the instantaneous value of the voltage. This voltage is the voltage that is generated by the silicon controlled rectifier power source. For purposes of analysis, it is convenient to assume a time of $t=0$ at the instant of the firing of the silicon controlled rectifier. In order to eliminate time dimension problems, it is also convenient to use a dimensionless time, $t$, which can be defined by the relationship $\omega T/K_8$, where $\omega$ is the angular velocity of the supply voltage in radians per second and is equal to $2\pi$ times the frequency in cycles per second. For a half wave silicon controlled rectifier power source, the value of $K_8$ is $2\pi$ while for a full wave silicon controlled rectifier power source, the value of $K_8$ is equal to $\pi$. Accordingly, by designating the zero to peak value of the line voltage as $E_0$, the silicon controlled rectifier waveform can be expressed as:

$$E_0 \sin 2\pi(a_6 - a_7 t)$$

where $a_6$ is the silicon controlled rectifier firing angle divided by $K_8$ and $a_7$ is equal to $K_8/2\pi$. This value will apply from the time of zero, up to the point where the current in the circuit attempts to reverse. When this occurs, the diode action of the silicon controlled rectifier will cause the effective value of $R_s$ to be infinite. Applying the Kirchoff law analysis, it is possible to obtain the following result:

$$\frac{\omega}{K_8}\frac{d(LI)}{dt} + IR_s = E_0 \sin 2\pi(a_6 - a_7 t) \quad (7)$$

Since the inductance, L, is a function of the air gap, it cannot be factored out except for the case where there is no vibration.

The results of this section can be put in a form more convenient for the dynamic analysis by defining a dimensionless valve lift, $x$, which is the actual lift divided by the lift when the plunger hits the stop. The relation of $x$ to the air gap, $g$, is:

$$g = K_9 x + 0.005 \text{ (cm.)} \quad (8)$$

where $K_9$ is the maximum plunger lift determined by the upper stop. A dimensionaless flux linkage, B, is defined by:

$$B = \frac{R_s}{E_0 a_4 a_8} LI \quad (9)$$

where $R_s$ is the series resistance of the coil, $E_0$ is the neutral to peak voltage of the sine wave power supply, $a_4$ and $a_8$ are group definitions defined below:

A dimensionless magnetic force is defined by $$F = \frac{F^1}{K_6} \quad (10)$$

where $K_6$ is the combined gravity and spring force at $x=0$. These transformations applied to Equations 4, 5, 6, and 8 yield:

$$L = \frac{a_8}{f_1(x)} \quad (11)$$

$$F = B^2 f_2(x) \quad (12)$$

$$a_3 \frac{dB}{dt} + a_4 f_1(x) B = \sin 2\pi(a_6 - a_7 t) \quad (13)$$

where $$f_1(x) = \frac{1 - a_{10} x}{1 - a_9 x} \quad (14)$$

$$f_2(x) = \frac{a_{11} + (1 - a_{11})(1 - a_5 x)(1 - a_{10} x)}{(1 - a_9 x)^2} \quad (15)$$

In each of the above relationships B is the dimensionless flux linkage, $a_5$, $a_9$, $a_{10}$, and $a_{11}$ are group definitions defined below.

The two functions of $x$, $f_1$ and $f_2$ are both unity when $x=0$. They are also both unity for an ideal magnet in which there were no leakage flux, no fringing flux and no mmf. drop in the iron. The definitions above produce the situation that when $x=0$, F is unity when B is unity which represents the condition for zero acceleration on the plunger. The variables $x$ and $t$ are rigidly bounded by the limits 0 and 1.

Having thus established an electromagnetic model, it is now possible to establish a dynamic model of the pulsed solenoid control action. Using the dimensionless variables defined above, a force-acceleration balance on the plunger yields the following relationship according to Newtonian dynamics:

$$a_1 \frac{d^2 x}{dt^2} + a_2 x + a_{12} \frac{dx}{dt} = Q \quad (16)$$

where $$Q = 0 \text{ for } X = 0 \text{ and } F < 1 \quad (17)$$

$$Q = F - 1 \text{ for } F > 1 \text{ and } B > 0 \quad (18)$$

$$Q = -1 \text{ for } B < 0 \quad (19)$$

and $a$, $a_2$ and $a_{12}$ are again group definitions defined below.

Equation 17 states that the negative movement of the plunger is restricted by the orifice, and Equation 18 represents the period of primary lift when the magnetic force is greater than the restraining force. As the lift and velocity become finite, the additional forces as represented by Equation 16, become finite. Equation 19 represents the condition of the silicon controlled rectifier cut-off. With this condition so stated, any force calculated in the integration of Equations 12 and 13 will be ignored for all times subsequent to the cut-off point of the silicon controlled rectifier. Referring to Equation 16, the term $$a_1\left(\frac{d^2 x}{dt^2}\right)$$

represents the acceleration of the plunger, where $a_1$ is proportioned to the mass. The term $a_2 x$ represents the increase in spring force as a result of plunger lift. The term $$a_{12}\frac{dx}{dt}$$

represents the damping term, and Q is the net unbalanced force on the plunger.

The initial boundary conditions which are applicable to Equation 16 are:

$$x = 0 \text{ at } t = 0 \quad (20)$$

$$\frac{dx}{dt} = 0 \text{ at } t = 0 \quad (21)$$

If $x$ should become equal to unity during the period of the primary lift of the plunger, an inelastic impact with the upper stop can be assumed. This condition, however, is not of a real practical importance. For purposes of analysis, the assumption can be mathematically stated as follows:

when $x = 1$ and $F > 1$ $$x = 1 \text{ and } \frac{dx}{dt} = 0 \quad (22)$$

when $x = 1$ and $F < 1$ $$\frac{dx}{dt} = 0 \quad (23)$$

When the plunger reaches the seat after the primary lift, that is when $x$ reaches zero, three possibilities of impact occur. The first of these possibilities is that an inelastic collision occurs so that $x$ remains zero until the next force cycle begins. That is to say, that the plunger will not vibrate off of the seat. The second of these possibilities is that a perfect elastic collision will occur so that the velocity of the plunger after the collision with the seat is the negative of the velocity before collision. The third of these conditions resides in a partially inelastic collision so that the velocity after collision is a fixed fraction of the negative of the velocity before collision. The third possibility actually includes the other two possibilities as limit cases. The mathematical statement of these conditions can be set forth as follows:

at $t = t_c$ and $\delta \rightarrow 0$ $$\left(\frac{dx}{dt}\right)_{t_c} + \delta = -a_{13}\left(\frac{dx}{dt}\right)_{t_c} - \delta \quad (24)$$

where $t_c$ is the time of the first contact after the primary lift of the plunger and, $a_{13}$ is the rebound constant, $a_{13}$ is a group definition more specifically defined below.

The above Equations 12 through 24 are a quantitative description of the vibrational process for the first cycle of the silicon controlled rectifier power supply. If the vibrations of the plunger persist beyond the point of $t=1$, the lift and velocity of the plunger at this time would replace the conditions in Equations 20 and 21 and the process would be repeated. As stated previously above, such a situation would lead to unstable operation and is not of practical interest herein except to define under what conditions the instability would occur. Therefore, for operation of the valve described herein, the operating parameters are restricted to the time interval of $0<t<1$.

For convenience, the various physical constants and variables which were used in the above theory to establish the mathematical model are set forth below. Also set forth below are the definitions of the various group functions used in establishing the mathematical model.

*Physical constants and variables*

A—Plunger cross-sectional area, cm.$^2$
B—Dimensionless flux linkage, defined by Equation 9
E—Instantaneous voltage
$E_b$—Back EMF generated by inductance
$E_0$—Neutral to peak voltage of sine supply
F—Dimensionless instantaneous magnetic force=magnetic force$\div K_6$
$F_g'$—Magnetic force due to air-gap flux, gms.
$F_s'$—Magnetic force due to solenoid pull, gms.
$g$—Effective air gap, cm.=measured air gap+0.005
$h$—Effective coil length, cm.
H—Magnetic intensity of coil, ampere turns/cm.
I—Instantaneous total current, amps.
$I_L$—Current through path containing inductance
$K_1$—Value of $g$ at $x=0$, cm.$=K_9+.005$
$K_5$—Plunger mass$\div$acc. of gravity, gms. sec.$^2$/cm.
$K_6$—Spring+gravity force at $x=0$, gms.
$K_7$—Spring rate, gms./cm.
$K_8$—$=2\pi$ for half wave SCR
   $=\pi$ for full wave SCR
$K_9$—Maximum plunger lift determined by upper stop, cm.
L—Inductance, henrys
N—Number of coil turns
P—Permeance of magnetic path, cm. or maxwells per gilbert-cm.
$P_c$—Effective fixed-gap plus iron permeance
$P_f$—Fringing permeance
$P_g$—Air-gap permeance
$P_s$—Solenoid-pull permeance parameter
$R_c$—Trigger circuit control resistance, K ohms
$R_{co}$—$R_c$ at zero flow point
$R_H$—Equivalent parallel resistance representing iron loss
$R_s$—Series resistance of coil
T—Time, seconds
$t$—$\omega T/K_8$, dimensionless time
$t_c$—$t$ when $x$ returns to zero for first time
$x$—Dimensionless instantaneous plunger lift=actual lift $\div K_9$ $$x_{av} \int_0^t \times dt$$

$$\beta \quad -\left(\frac{dx}{dt}\right)t=tc$$

$\sigma$ Fringing parameter $=\dfrac{A+\Delta A}{A}$ $\Delta t_v$—Value of $t$ between $t=t_c$ and time vibrations stop
$\phi$—Flux maxwells
$\phi_s$—Total flux entering bottom of plunger that crosses the coil radially. (Solenoid-pull flux.)
$\phi_g$—Flux crossing the air gap normal to surface
$\omega$—Angular velocity of sine supply voltage radians/sec.
  $=2\pi$—frequency

*Group definitions*

$$a_1 = \frac{K_5 K_9 \omega^2}{K_6 K_8^2}$$

$$a_2 = \frac{K_7 K_9}{K_6}$$

$$a_3 = \frac{C_1(1+C_3K_1)\omega}{K_8 E_0} \sqrt{\frac{K_6}{C_2+C_5K_1(1+C_4K_1)}}$$

$$a_4 = \frac{R_s(1+C_4K_1)}{E_0} \sqrt{\frac{K_6}{C_2+C_5K_1(1+C_4K_1)}}$$

$a_5 = K_9/K_1$ $a_6 = $ SCR firing angle $\div K_8$ $a_7 = K_8 \div 2\pi$ $$a_8 = \frac{C_1(1+C_3K_1)}{1+C_4K_1}$$

$$a_9 = \frac{C_3K_9}{1+C_4K_1}$$

$$a_{10} = \frac{C_4K_9}{1+C_4K_1}$$

$$a_{11} = \frac{C_2}{C_2+C_5K_1(1+C_4K_1)}$$

$a_{12}$ damping factor (Equation 16)

$a_{13}$ rebound factor (Equation 17)

$C_1 = 1.26 \times 10^{-8} N^2 P_o$ $$C_2 = \frac{0.643 \times 10^{-4} N^2 P_o^2}{\sigma^2 A}$$

$C_3 = P_s/6A\sigma$ $$C_4 = \frac{P_o + 0.25 P_s}{A\sigma}$$

$$C_5 = \frac{0.815 \times 10^{-4} N^2 P_s P_o}{h A \sigma}$$

A complete mathematical solution to the above equations can be effectively obtained by programming the equations for digital computation. In the present case, these equations were programmed for the "IBM 704" digital computer for the time interval $0<t<t_c$. It was found that the experimental measurements are in substantial agreement with and confirm the validity of the above mathematical model. To illustrate the validity of the model, the data in Table I set forth below and which relates the air gap as a function of the power source was used to fit the five constants of Equations 4, 5 and 6. The results of this curve fitting are presented in Table I.

TABLE I

*Fitted constants for model*

$K_1 = .130$ cm.
$K_5 = .0163$ gms. sec.$^2$/cm.
$K_6 = 299$ gms.
$K_7 = 172$ gms./cm.
$K_8 = 2\pi$
$K_9 = .125$ cm.
$A = .605$ cm.$^2$
$\sigma = 1.02$
$E_0 = 168.5$ volts
$h = 4.58$ cm.
$N = 4000$
$R = 265$ ohms
$r_1 = 0.610$ cm.
$r_2 = 1.49$ cm.
$\omega = 377$ rad./sec.

TABLE I (Continued)

Fitted Constants for Model $r$ = variable fixing flow rate
$P_s = 32.2$
$C_1 = 4.60$
$C_2 = 0.85 \times 10^6$
$C_3 = 8.7$
$C_4 = 50$
$C_5 = 0.340 \times 10^6$
$P_c = 22.8$

Dimensionless groups $a_1 = 0.0245$
$a_2 = 0.0719$
$a_3 = 0.0555$
$a_4 = 0.1878$
$a_5 = 0.962$
$a_6 =$ variable
$a_7 = 1.000$
$a_8 = 1.306$
$a_9 = 0.510$
$a_{10} = 0.8333$
$a_{11} = 0.7190$ Calculated $a_6$ when lift begins $= 0.1611$ A test of this model is presented in Table II which compares actual and calculated forces for the silicon controlled rectifier power, example in Table II.

TABLE II.—COMPARISON OF CALCULATED AND ACTUAL MAGNETIC FORCE FROM SCR POWER

| Air gap | Inductance | | Current, ma. | | Force, gms. | |
|---|---|---|---|---|---|---|
| | Actual | Calc. | Actual | Calc. | Actual | Calc. |
| .005 | 3.26 | 3.33 | 22.4 | 22.0 | 320 | 183 |
| .01 | 2.90 | 2.97 | 30.2 | 29.5 | 318 | 241 |
| .02 | 2.50 | 2.49 | 42.1 | 42.0 | 317 | 303 |
| .04 | 2.02 | 1.97 | 62.3 | 63.9 | 313 | 347 |
| .08 | 1.52 | 1.52 | 94.4 | 94.5 | 306 | 323 |
| .16 | 1.15 | 1.21 | 139.1 | 135.0 | 292 | 293 |
| .125 (assy) | 1.27 | 1.306 | 119.5 | 117.2 | 299 | 288 |

It is also possible to obtain a comparison of the effective and actual dimensions of the magnetic circuit as follows:

| | Fitted | Actual |
|---|---|---|
| Turns | 4,000 | 4,000 |
| Plunger area | .617 | .670 |
| Effective $r_1$ for leakage, cm | .610 | .46 |
| Effective h for leakage, cm | 4.58 | 3.15 |
| Iron permeance, $P_c$ | 22.8 | 28 at $\mu = 200$ |

The "IBM 704" digital computer was programmed to calculate cycle averages and maxima of lift, force, and current. The calculated results of the complex magnetic model is set forth in Table III above.

From this table, it can be seen that there is an excellent correlation of the magnetic model to the experimental data and these experimental data are sufficient vertification of the basic theory of the control action.

Stability limits of operation

The solution of the above mathematical model relies upon the assumption that both the lift of the plunger and the plunger velocity are zero at the start of the voltage cycle. As previously mentioned, if this condition is not met, instability of the valve will result. While it is possible to solve the mathematical model for a finite initial velocity and lift of the plunger, this condition would have no practical value due to the resultant instability of the valve. Therefore, it is only necessary to be able to calculate a firing angle at which vibrations persist for times no longer than 1.0 on a dimensionless time scale. It is possible to operate if vibrations have stopped before the force has built up to the lift-off point of the plunger on the following voltage cycle. For simplicity, however, and with little error, stability limits can be set by determining the value of $a_{11}$ so that the final vibration ceases at a time of $t = 1$. For a Teflon or steel seating material, such as employed in the present valve, this limitation determines the maximum controllable flow rate.

For materials with a low rebound constant, such as Buna N rubber, the upper controllable rate is determined by the plunger hitting the upper stop, during the primary lift. Although no instability is encountered with greater firing angles, it is found that by both experimental observation and calculation that beyond the point at which the first contact is made, the flow rate will fall off slightly with increased firing angle and then slowly rise again. Thus, a condition of multiple stable states would be encountered in this region. This, of course, is a situation which should be avoided in automatic flow control.

The existence of the stability criterion, that is to say, no motion at the start of a force cycle, explains the reason for success in the use of a half-wave silicon controlled rectifier power source for obtaining effective control, while amplitude control of a sine wave power source is not effective. By the employment of a silicon controlled rectifier power source, the force pulse is followed by a long period, the quiescent period or negative cycle, in which no force pulse is produced by the solenoid. This allows vibrations to be extinguished prior to the next pulse. When compared to the use of sine wave power, an identical force pulse is produced during the negative cycle, and it is necessary to have the vibrations extinguished before this cycle begins. Reduction of the vibration with a sine wave power source materially restricts the operable range of control. Hence, it can be seen that a far greater dynamic range of control is obtainable with the use of a silicon controlled rectifier power source.

TABLE III.—RESULTS FOR COMPLEX MAGNETIC MODEL

| $a_6$ | $X_{max} \times 10^4$ | $\beta$ | $t$ When lift begins | $t$ At first contact | Calculated | | Experimental* $X_{av} \times 10^4$ |
|---|---|---|---|---|---|---|---|
| | | | | | $a_{13} = 0 \; X_{av} \times 10^4$ | $a_{13} = .857 \; X_{av} \times 10^4$ | |
| .1611 | 0 | 0 | | | 0 | 0 | 0 |
| .162 | 2.7 | .049 | .1187 | .1704 | 0.1 | 0.1 | 0.1 |
| .163 | 12.1 | .147 | .1139 | .1890 | 0.4 | 0.42 | 0.32 |
| .164 | 28.3 | .275 | .1104 | .2036 | 1.3 | 1.44 | 1.30 |
| .165 | 51.7 | .425 | .1071 | .2164 | 2.7 | 3.2 | 3.0 |
| .167 | 121 | .773 | .1030 | .2389 | 7.9 | 11.1 | 11.9 |
| .170 | 285 | 1.377 | .0978 | .2683 | 23.6 | 41.4 | 42.0 |
| .173 | 530 | 2.017 | .0937 | .2971 | 52.4 | 108 | 108 |
| .176 | 866 | 2.640 | .0903 | .3253 | 99.5 | 225 | 227 |
| .177 | 1,000 | 2.847 | .0893 | .3349 | 120.4 | 277 | 280 |
| .180 | 1,476 | 3.476 | .0862 | .3646 | 203 | | |
| .185 | 2,552 | 4.586 | .0828 | .4177 | 430 | | |
| .190 | 4,081 | 5.813 | .0797 | .4768 | 832 | | |

$a_1 = 0.0245$, $a_2 = 0.0719$, $a_3 = 0.0555$, $a_4 = 0.1878$, $a_5 = 0.962$, $a_7 = 1.000$, $a_8 = 1.306$, $a_9 = 0.510$, $a_{10} = 0.8333$, $a_{11} = 0.7190$, $a_{12} = 0$.
*Calculated from measured flow rate of nitrogen using teflon plunger.

The invention is further illustrated by, but not limited to the following examples.

Example 1

The control valve of FIGURE 1 was combined with the control circuit of FIGURE 3 in order to study the effect of the controllable factors which affect the operation of the valve. The valve employed was a Hoke S90A320CT solenoid valve which had the following valve dimension:

| | | |
|---|---|---|
| Plunger weight | gms | 16 |
| Plunger outer diameter | cms | 0.92 |
| Plunger stop outer diameter | cms | 0.84 |
| Plunger cross-sectional area | cms² | 0.67 |
| Effective axial plunger length | cms | 4.4 |
| Outer shell, outer diameter of plunger | cms | 4.1 |
| Outer shell thickness | cms | 0.159 |
| Orifice diameter | cms | 0.076 |
| Orifice outer diameter | cms | 0.203 |
| Effective orifice diameter | cms | 0.094 |
| Air gap when plunger seated | cms | 0.125 |

The solenoid coil of the control valve is characterized by the following data.

| | | |
|---|---|---|
| Total coil turns | | 4000 |
| DC resistance (including compensator resistors) | ohms | 265 |
| Wire size | ga | 33 |
| Coil inner diameter | cm | 1.35 |
| Coil outer diameter | cm | 2.98 |
| Coil height | cm | 3.15 |

This valve was fitted with a Teflon seat and had an all stainless steel construction. The valve which was constructed of type 430F stainless steel had an initial permeability of 200, a maximum permeability of 1400 and a saturation flux density of 14,000 grams. The orifice seating was milled approximately 0.005 inch from the surface which was followed by polishing with an 1800 grit diamond to a mirror finish. This operation produced an annular seating area of approximately 0.080 inch outer diameter by 0.030 inch inner diameter.

The parts in FIGURE 3 which form the control circuit and which were used in the experimentation are listed below:

| | |
|---|---|
| Cadmium sulfide transducer | Light and receiver (relay Sigma 8RCO1A set removed) |
| Resistor 64 | 10K ½ watts. |
| Resistor 64 | 3500 10 watt. |
| Resistor 53 | 300 1% precision 2 watt. |
| Resistor 55 | 47. |
| Resistor 44 | 100 2 watt 1% precision. |
| Thermistor | Fenwall LA23J2. |
| Surge suppressor 57 | Sarkes S-491 140 v. RMS. |
| Capacitor 52 | 0.1 200 mfd. |
| Diode 56 | 1N 1695. |
| Zener diode 58 | 1N 1779 22 v. |
| Unijunction Transistor 46 | 2N1671A. |
| Silicon controlled rectifier 40 | 2N 1597 200 PIV 1.6 A. |
| Potentiometer 51 | 100K 4 watt wire wound Mallory M100MPK. |
| Potentiometer 50 | 10K 4 watt wire wound Mallory M10MPK. |
| Potentiometer 63 | 100K 2 watt carbon ohmite CLU1041. |
| Constant voltage transformer | Sola Cat. No. 23-13-060 60 v.a. at 115 v. |

To be of use in a practical control operation, the combination of the controller and valve must be insensitive to ambient temperature changes and line voltage changes. As might be expected from the principle of operation, sensitivity to line voltage variation was found to be considerable. A one percent change in line voltage produced a 40 percent change in flow rate at a constant resistance setting. Powering the control circuit from a Sola constant voltage transformer (Catalogue No. 20-13-060) reduced this change of flow rate to less than 2 percent flow change per percent line voltage change. The sources of ambient temperature arise from the effect of temperature on the solenoid coil resistance and the effect of temperature on this unijunction transistor relaxation oscillator. Both of these effects were eliminated by adjusting the resistors experimentally to produce no flow change on heating the components in question from 25 to 40 degrees C. with a hot air gun. Adjusting the resistor 53 eliminates temperature effects on the unijunction transistor 46 and adjusting the resistor 44 eliminates temperature effects on the solenoid coil 3.

Figure 8:
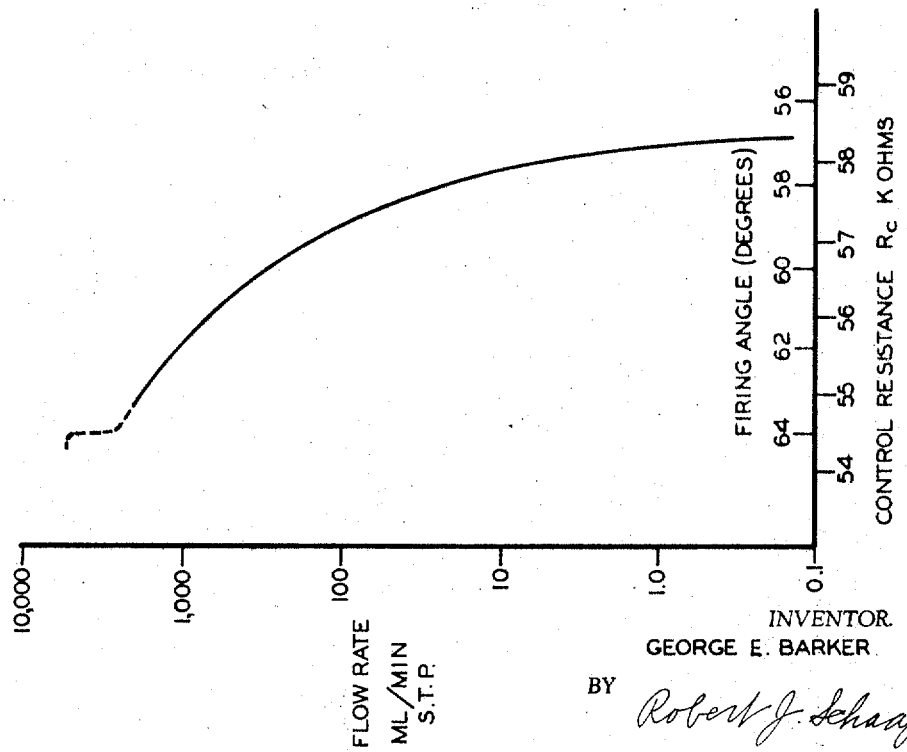
FIGURE 8 is a diagrammatical view showing the flow rate through the valve of FIGURE 1, as a function of the firing angle and as a function of the control resistance in the control circuit of FIGURE 3.

The wide dynamic range of the control system is shown in FIGURE 8 and plots the flow rate in millimeters per minute as a function of the control resistance and the firing angle in degrees. The average deviation of the points from the smooth curve was +/−0.28K ohms or about +/−0.5% over a three-week test period. Over shorter periods, such as one hour, deviation was about 0.15%. The long term stability test was continued for 2,000 hours to determine ultimate seat wear. Inspection of the seat after this time of use revealed no noticeable wear.

An inspection of the controllable factors reveals the remarkable characteristics of pulsed-solenoid control mode of action, such as the wide dynamic range over which modulating flow action can be obtained. It can be seen that this dynamic range is approximately 100 times greater than conventional control valves. Moreover, the response rate of the electrically operable control valve A is approximately 10 times faster than any of the conventional control valves. Each of the various factors of the control valve and control circuit design is set forth below.

Effect of plunger lift

In order to relates the flow rate through the valve A through the average lift of the plunger 20 for vibrational operation, it was necessary to calibrate the valve for flow at a constant known plunger lift. Experimentally, nitrogen flow in the critical region was chosen for the basic flowing fluid. An assumption of critical flow above the critical pressure ratio can be vertified experimentally. The magnetic characteristics of the valve can be used to obtain the known lift conditions. A Teflon disc was adhesively secured to the plunger over the normal seat so that it was possible to obtain a zero lift condition. A millimeter scale was secured to the outer cover of the valve body as an indicator. When the valve was subjected to a known upstream pressure the body was rotated and the zero flow point determined to an accuracy of 0.0005 cm. with the coil powered from a 110 volt supply. The plunger was always held firmly against the upper stop. By merely rotating the valve body a fixed angular distance allowed the effective lift to be precisely determined.

A nitrogen upstream pressure was set 34.4 pounds per square inch (absolute) with the valve exhausted to atmospheric pressure, i.e. 14.4 pounds per square inch (absolute), at 24° C. Flow rates were measured with a bubble meter at the lower flows and with a wet test meter at higher flows. For this purpose, a Hoke S90A320CT solenoid valve was employed and was modified to have a $\frac{1}{32}$ inch orifice and a Teflon seat. The valve was also modified to have an annular seating area of 0.080 inch outer diameter by 0.030 inch inner diameter. The results of the plunger lift in relation to the flow rate produced a substantially linear curve. The flow rate in millimeters per minute STP was approximately equal to $3.7 \times 10^5 \times$ the valve lift in centimeters. This type of calibration thus obtained, permitted prediction of a flow rate from the calculated average lift of the plunger under vibrating conditions, and thereby provided an independent check on the experimental flow rates under vibrating conditions.

Effect of firing angle

The most important single variable governing pulsed-solenoid flow control action is the firing angle of the pulse current transmitted to the solenoid coil 3. At higher flow rates, an unstable region of valve operation exists which is caused by secondary or rebound vibrations and is the result of the combination of an elastic seat material and the almost complete lack of damping with a gas flow. When a rubber seat was used, this type of effect disappeared. If water is the fluid, and a Teflon seat is employed, the effect also disappears. Elimination of this type of instability increases the upper flow rate permitted by the valve by a factor of approximately 10.

Under any conditions, the upper flow rate is determined by contact of the plunger 20 with the upper stop 17. When the firing angle was increased beyond this point, the flow rate dropped off slightly before increasing again. This is not a serious defect, but however, an erratic hysteresis effect will follow plunger contact with the upper stop. The lower limit of controllable flow is determined almost entirely by the quality of the basic seal between the plunger 20 and the orifice and the seat 30. With a Teflon seat, and a 20 pound per square inch differential across the seat, the basic leakage is almost immeasurable.

Effect of pressure

The effect of pressure on the flow rate is rather complex. At low pressure differentials or at larger firing angles, the effective pressure is similar to the pressure on a valve of fixed opening. At high differential pressures and firing angles near the minimum angle (zero flow point), increasing the pressure causes a decrease in the flow rate. A high pressure tends to force the valve plunger to the closed position with a force equal to the effective cross-sectional area of the plunger multiplied by the differential pressure across the valve. This force adds to the normal spring force biasing the valve plunger to its closed position and requires larger firing angles to overcome this complementary addition of forces. Therefore, the differential pressure force places a limit on the upper pressure rating of the valve and/or the maximum orifice diameter that can be used without an appreciable off-set in the control point.

The effect of pressure on the zero-flow point was determined with the aforementioned Hoke control valve, for a helium flow from 0 to 2460 pounds per square inch (gauge) and the results are set forth in Table IV below. By using a mathematical model, it is possible to determine the differential pressure force and allow for calculation of an effective orifice area.

TABLE IV.—EFFECT OF PRESSURE ON ZERO-FLOW POINT

| Differential pressure (p.s.i.g.) | Control resistance at zero-flow point (K ohms) | Maximum magnetic force (grams) | Δ F/Δ P |
|---|---|---|---|
| 0 | 59.5 | 303 | |
| 20 | 59.2 | 314 | 0.55 |
| 100 | 58.1 | 356 | 0.53 |
| 300 | 55.8 | 450 | 0.49 |
| 650 | 52.6 | 595 | 0.45 |
| 2,460 | 28.7 | (2,290) | (0.81) |

The above conditions were determined using 0.203 cm. outer diameter and a 0.076 cm. inner diameter orifice with an air gap of 0.10 cm.

The off-set produced at 300 p.s.i.g. was approximately equal to the proportional band at 0 p.s.i.g. and provided an approximate limit to the practical pressure range. If automatic reset were incorporated in the control action, a considerably wider range would be permissible. The nature of the critical flow phenomenon can be demonstrated for flow plotted as a function of the difference in control resistance between the zero-flow point and a particular selected point related to the average lift.

Effect of fluid viscosity

As a result of a study conducted by using both a gas and a liquid, such as nitrogen and water respectively, as a fluid, it was determined that the damping effect created by fluids of different viscosity is negligible for low amplitude vibrations. Nitrogen was employed as the gas media at 19.4 p.s.i.a. at 24° C. The liquid employed was water with an inlet pressure of 40 p.s.i.g. and temperature of 10° C. An air gap 0.13 centimeter was employed.

Table V shows the comparison of water flow and nitrogen flow.

TABLE V.—EFFECT OF FLUID VISCOSITY ON FLOW RATE

| Control resistance (K ohms) | Water flow, cc./hr. | N₂ flow cc./min., STP | Equiv. water flow, cc./hr. |
|---|---|---|---|
| .5 | 30 | 8 | 50 |
| .6 | 50 | 11 | 70 |
| .8 | 120 | 20 | 130 |
| 1.0 | 200 | 31 | 200 |
| 1.5 | 470 | 72 | 470 |
| 2.0 | 800 | 130 | 850 |
| 2.5 | 1,200 | 200 | 1,300 |
| 3.0 | 1,600 | 260 | 1,700 |
| 3.5 | 2,000 | 340 | 2,200 |
| 4.0 | 2,500 | 420 | 2,700 |
| 4.5 | 3,000 | 470 | 3,070 |
| 5.0 | 3,600 | 720 | 4,700 |
| 6.0 | 5,100 | 1,200 | 7,800 |
| 9.5 | 16,000 | | |

The control resistance above was determined at zero flow. The control resistance is 9.5K ohms when the plunger contacts the lower stop and the fluid is water. The control resistance is 6.0K ohms when the plunger contacts the lower stop and the fluid is nitrogen. The equivalent water flow for nitrogen was obtained by multiplying nitrogen flow in cc./min. by 6.5.

Effect of plunger closing force

The effect of the force with which the plunger shifts to its closed position was simply measured by obtaining data with the plunger in the up position and with the plunger in the down position in orientation, thereby causing a change in force equal to twice the weight of the plunger. The following table (Table VI) shows the result of such experimentation and it can be seen that this variation produced a relatively constant off-set.

TABLE VI.—EFFECT OF CLOSING FORCE ON FLOW RATE

| Water flow, cc./hr. | Control resistance, K ohms | | |
|---|---|---|---|
| | Plunger up | Plunger down | Difference |
| 0 | 56.7 | 57.6 | .9 |
| 10 | 56.1 | 57.1 | 1.0 |
| 30 | 56.0 | 57.0 | 1.0 |
| 100 | 55.7 | 56.7 | 1.0 |
| 300 | 55.3 | 56.3 | 1.0 |
| 1,000 | 54.2 | 55.3 | 1.1 |
| 3,000 | 52.0 | 53.0 | 1.0 |
| 10,000 | 48.3 | 49.4 | 1.1 |

These data were obtained by using the aforementioned Hoke valve with the water flow at 10° C., 40 p.s.i.g. at the inlet. The air gap was maintained at 0.13 centimeter and the orifice diameter was 0.135 centimeter.

Effect of air gap

The air gap can be defined as the vertical lift from the seat to produce contact with the upper stop. Experimental analysis has shown that the air-gap effect is similar to the effect caused by a change in spring force in that it produces a fixed off-set. The effect was studied by making nitrogen test data analysis with the body of the aforementioned Hoke valve unscrewed for a fixed angular distance.

Effect of seat material

In addition to the obvious effect on leakage, the seat composition also has a strong effect on the secondary or rebound vibrations. In general, secondary vibrations are undesirable, affecting instability adversely, and also producing most of the noise associated with pulsed solenoid operation.

Four seat materials were tested: the tetrafluoroethylene polymer "Teflon"; a fluoroelastomer rubber containing hexafluoropropylene and vinylidene fluoride normally marketed under the trade name "Viton A"; a butadiene acrylonitrile copolymer normally marketed under the term "Buna N" rubber; and hardened steel. The steel seat showed almost perfectly elastic impact and produced strong secondary vibrations and considerable high frequency noise. The poor seating properties of steel also caused leakage rates eliminating steel as a seat material. The Viton A, material which is quite soft, exhibited erratic performance inasmuch as two meta-stable states of vibration can occasionally exist. Teflon was found to possess a desired elastic coefficient for an adequate range of stable operation.

Regardless of the seat material, improved short-term stability can be achieved by preventing radial vibrations of the plunger. This was easily accomplished by wrapping the upper end of the plunger with 1½ turns of 0.0035" thick Teflon "pipe dope" tape ¼" wide. This produces a fit with about 0.001" clearance and also prevents metal-to-metal contact. With this arrangement, audible noise is barely detectable, and short-term (10 minutes) open loop stability is better than ±5%.

Also for any seat material, greatly improved basic leakage rate can be obtained by preventing rotation of the plunger on the orifice. This readily done by silver-soldering a tab on the body which keys into one of the grooves of the plunger. This groove is marked so that the plunger is always reassembled in the same position. This method eliminates the effect of the slight non-concentricity of the plunger with the orifice so that the orifice indentation on the seat is in the same radial orientation.

Average force data

The average force per cycle can be determined by using a balance. This can be accomplished by unscrewing the lower valve body thereby leaving the lower end of the plunger projecting from the plunger assembly. With the main spring 15 still in its position, the upper body is suitably mounted above a triple beam balance with the lower face of the plunger adhesively secured to the balance pan. Vertical adjustment of the upper valve body and use of the balancing lines of the triple beam balance permitted a careful setting of the air gap. The balance reading, at this point, without power applied to the solenoid coil 3 was then a measure of the spring plus gravity force holding the plunger 20 against the valve seat. On the application of power to the coil, the change in balance reading at a constant air gap was then a measure of the average magnetic force of each pulse cycle, since the combined mass of the balance pan and the plunger adhesively secured thereto prevented vibration. If the valve were then assembled with this air gap, vibration and flow would begin at a constant control resistance of approximately 60K ohms. At this value, the average force is only 47 grams compared to 306 grams of spring force. This factor in itself, indicates that control action was not obtained by the magnetic force opposing the spring force which is the case in the usual steady-state manner.

Maximum force data

The maximum magnetic force generated during a voltage cycle is one of the more important variable factors to be determined in the electrically operable control valve. Its precise measurement is almost essential to a quantitative understanding of the pulsed-solenoid control action. The new vibration phenomenon provides a precise means of measuring this maximum magnetic force. The combined spring and gravity force is easily determined as a function of the air gap. Thus, at any given selected air gap, if the voltage across the solenoid coil is adjusted so that vibration just commences, the maximum force exerted upon the plunger must exactly equal the spring and gravity force shifting the plunger downwardly. The electrical measurements made under these conditions of incipient flow provide in addition to the electrical data, the maximum force occurring at these conditions. This data is included in Table VII set forth below. It is in effect a summary of all electrical data taken under conditions of incipient flow. Table VII illustrates the change of air gap with use of DC current, sine wave power and SCR power for operation of the control valve A.

In determining the maximum force, there are two independent criteria. One criteria is the appearance of a small flow rate. The second criteria is a marked change in sound heard through a listening rod held against the valve. The new sound waves were those associated with vibration of the plunger off the seat and were of much higher frequency than the 60 cycle electrical hum. In practice, these two criteria agreed within experimental error in the determination of lift-off.

TABLE VII.—MAXIMUM FORCE AND ELECTRICAL DATA AT INCIPIENT VIBRATION POINT

| | Air gap, cm. | | | | | | |
|---|---|---|---|---|---|---|---|
| | 0.005 | 0.01 | 0.02 | 0.04 | 0.08 | 0.16 | 0.125 (assy.) |
| Maximum force (grams) | 320 | 318 | 317 | 313 | 306 | 292 | 299 |
| DC current (milliamperes) | 24.0 | 33.0 | 45.0 | 63.0 | 90.0 | 131.0 | 115.0 |
| Sine wave power: | | | | | | | |
| Maximum current (milliamperes) | 29.5 | 37.5 | 48.7 | 67.2 | 96.0 | 131.0 | 118.8 |
| Impedance (ohms) | 1205 | 1108 | 995 | 842 | 674 | 545 | 588 |
| Inductance (henrys)* | 3.26 | 2.90 | 2.50 | 2.02 | 1.521 | 1.151 | 1.274 |
| SCR power at $E_o$=168.5 volts: | | | | | | | |
| Firing angle | 0.0965 | 0.1070 | 0.1197 | 0.1340 | 0.1502 | 0.1670 | 0.1593 |
| Maximum current (milliamperes) | 22.4 | 30.2 | 42.1 | 62.3 | 94.4 | 139.1 | 119.5 |

*Calculated with iron-loss resistance of 2,000 ohms.

Phase and firing angle

Accurate measurement of the silicon controlled rectifier firing angle as a function of control resistance is essential to the development of a meaningful physical and mathematical model. Measurements of this type are made with an electronic timer capable of time interval measurement with a precision of at least one microsecond. Triggering of the timer was obtained by the voltage difference between the silicon controlled rectifier anode and cathode. The timing commenced when this voltage approached zero from the positive and stopped when the voltage became negative. It was possible to define the firing angle $f$ as the firing time in microseconds multiplied by the factor of $60 \times 10^{-6}$. With the control resistance in K ohms the firing angle was correlated by the following relationship:

$$f = 0.4644 - 0.00526 R_c$$

where $R_c$ is the control resistance.

Determination of rebound constant and stability limits

The desired rebound constant is the ratio of the velocity of the plunger after impact, to the velocity of the plunger immediately before impact. In other words, the rebound constant is also related to the kinetic energy lost on impact. The rebound constant cannot be measured by dropping the plunger 20 on the seat 30 since the impact pressure of the plunger 20 on the seat 30 exceeds the elastic range of the Teflon material forming the seat, whereas in actual operation of the valve, the impact pressures are within the elastic range.

If the voltage across the solenoid coil 3 is displayed on an oscilloscope and the valve is operated at relatively large amplitudes, which are below the unstable point of flow, a high frequency fine structure can be observed on the oscilloscope screen after the cut-off point of firing a pulse from the silicon controlled rectifier and before the next firing pulse, that is during the quiescent period. This type of pattern appears as sharp "blips" on the decaying voltage curve following each pulse cut-off. The amplitude of the "blips" decreases with each succeeding "blip" and the spacing or time between each "blip" also decreases. Thus, all "blips" which, in effect, measure the vibration of the plunger, stop at a finite and measurable time before the start of the next cycle.

This "blip" pattern is more fully illustrated in FIG-URE 7, and compares the voltage force with the magnetic force and the lift of the plunger. This "blip" pattern describes a condition where the plunger 20 is generating voltage during the quiescent period in the same manner as an electric motor. Since the main circuit is de-energized immediately after the cut-off of the silicon controlled rectifier, there is only an iron-loss load across the solenoid coil 3. This sudden change in the speed of the plunger 20 at impact with the seat 30 produces a relatively large voltage "blip." Accordingly, measurements from an oscilloscope screen provide a desirable method of measuring the rebound constant.

It can be shown that the ratio between the adjacent "blips" in a frequency pattern is directly related to the rebound constant desired. A geometric series relating the first and last "blips" in a frequency pattern to the rebound constant can be generated according to mathematical theory. The measurement of this relationship is sometimes desirable inasmuch as there is a small horizontal dither of the "blips" on a oscilloscope screen which makes precise measurement rather difficult. The dimensionless time between "blips" can be measured directly from the scope as the horizontal distance between the first and last "blip" can be divided by the horizontal distance between voltage cycles. The initial velocity of the plunger can be calculated from the model providing that the difference in firing angle between zero flow and actual flow conditions is known.

Oscilloscope observations of the secondary or rebound vibrations also enables a setting of the stability limits of the operation of the valve. As the firing angle is slowly increased, the point where the secondary vibrations will cease more closely approaches the start of the next firing cycle. With an increase of the firing angle slightly greater than that required for the vibrations to enter the next cycle, the operation of the valve would become unstable, and the plunger will erratically strike the upper stop 17. Obviously, a good criterion for the stability of the valve is that the secondary vibrations have completely ceased before the force exerted by the solenoid coil 3 has build up to the compressed spring force on the following cycle.

*Example 2*

An actual control operation was demonstrated by using the control system of Example 1 as a liquid level controller. The sensing method was the refraction setting of the photocell as described in copending application Ser. No. 323,383, file Nov. 13, 1963. The basic transducer was a cadmium sulfide photocell, the resistance of which decreased with light intensity. A collimated light source was directed perpendicular to the axis of the liquid level tube in a position off-center to the axis of the tube. For this purpose, a 10 mm. O.D. glass tube was used as a level gage and attached to a simulated process vessel containing water at atmospheric pressure. The presence of the liquid in the tube, the index of refraction of which was greater than the index of refraction of the vapor, caused the light beam to be refracted laterally when the liquid was present. The carmium sulfide light sensitive transducer was incorporated in the control circuit as shown in FIGURE 4 and mounted in a lateral position so that its light slit was illuminated when liquid was present and masked by the slit when vapor was present. The receiving window or slit was vertically disposed giving a height of about 0.7 inch over which light intensity varied with level. Moreover, it was masked to a width of about 3 mm.

The feedback controller simulated a reboiler level control on a fractionating column. Water was fed to the vessel from the supply at a rate set by a throttling valve in the line. The exit line from the vessel was connected to the inlet of the control valve which in turn discharged to the atmosphere. Thus, the valve would modulate to control the level within the set proportional band regardless of the inlet rate. Reset and proportional band adjustments were made with potentiometers 65 and 93 of FIGURE 4.

The control valve was fed from a constant pressure source of water at 40 p.s.i.g. at 10° C. The liquid level was set in the process vessel, and the flow rate measured with the valve discharging to atmosphere. These are the conditions that would prevail if the process vessel were operating at 40 p.s.i. FIGURE 10 shows the response curves for two different settings of the series and shunt potentiometers. These settings were chosen to demonstrate the effects of the wide dynamic range of the control valve. It is to be noted from FIGURE 10 that the result is a tenfold change in flow rate over the same level change. With a conventional control valve, this change would have required a change in valve trim. The lower curve also demonstrates the sensitivity of the control circuit. The flow change resulting from a level change of 1.25 to 1.30 inch results from a 0.7% decrease in total circuit resistance.

*Example 3*

It is possible to employ the aforementioned electrically operable control valve in pressure control operations by adapting the cadmium sulfide photocell sensor to make either an upstream or downstream pressure controller. An Ashcroft 4½ inch, 0–30 p.s.i.g. was used (Catalog No. 1297A). The active cadmium sulfide transducer which is an RCA 7163 cell, can be mounted by press-fit into the rear of the gauge case. A small aperture was made in the dial plate of the gauge to allow light to reach the photocell. A light source conveniently made from a Dialco pilot light assembly with a NE–51H bulb was mounted on the case with light directed towards the photocell. A control flag was added to the indicator by using a spare Ashcroft needle with the flags adhesively secured thereto. A second needle was mounted on the hub of the original indicator using an O ring to effect a sliding friction set between the two needles. A small groove was cut in the hub with a snap ring added to retain the O ring. Thus, the control flag needle could be moved independently of the main indicator needle and an indicating-controller was made from this guage. The flag which was secured to the control needle was designed to mask the hole in the dial so that as the pressure increased, the light was reduced to the photocell. A mechanical stop was soldered to the bracket holding the light assembly so the flag would not swing beyond a certain limit encountered beyond the hole and the lower stop removed so that it would not interfere with the control flag.

This arrangement with the control circuit of FIGURE 3, would produce downstream control action. Upstream control action can be obtained by reversing the flag action or by changing the electronic characteristics of the trigger circuit. With the arrangement described, the cadmium sulfide light sensitive transducer varied from a minimum of 30K ohms to 350K ohms over the 0.5 lbs. per square inch proportional band. To prevent oscillations within this narrow proportional band, it was necessary to shunt the photocell with about 30K ohms from the potentiometer 50. Even with this type of shunt, and a nitrogen supply pressure of 25 p.s.i.g., control at 5 p.s.i.g. showed a drop of only 0.2 p.s.i. from the dead shut-off to the maximum stable flow. Again, the speed of response was limited by the inertia of the tube itself and not the control valve.

Example 4

The control valve A was used in a high pressure control valve application described below. The use of a self-contained differential pressure controller between the control valve and the downstream pressure permits a constant pressure differential to be maintained across the control valve regardless of either upstream or downstream variations. The controller was constructed from a Pressure Products, Inc., gauge protector, which was basically a ½ inch cylinder fitted with an O ring-sealed piston. The cylinder was provided with an outlet port, an inlet port from the solenoid inlet and an inlet port from the solenoid exit. The control valve is placed upstream with the high pressure in the orifice. The high pressure is also connected to the upper end of the piston and the exit of the control valve connected to the area between the piston and the seat of the differential controller. The piston-stem assembly was made from the original piston by drilling a guide hole and silver soldering a ¼ inch stainless steel rod ¾ inch long to one transverse end of the piston. The end of the rod (the sealing surface) was faced flat in a lathe and polished with crocus cloth.

The valve was provided with a Teflon seat which was made by drilling is $\frac{1}{32}$ inch hole through a piece of ⅛ inch Teflon rod. The rod was inserted up against the back-up stop and cut off with a razor blade leaving about 0.02 inch protruding. The short back-up stop was made from a piece of ⅛ inch stainless steel tubing. The spring which determines the differential pressure was hand-wound from a piece of $\frac{1}{16}$ SS capillary tubing. Free length was 0.86 inch, compressed length 0.72 inch, O.D. 0.475 inch, active coils 6¼, maximum shear stress at 50 p.s.i. differential: 50,000 p.s.i. The spring construction, however, was not critical since the piston movement was essential zero and no fatigue problem exists. In operation, the differential controller closed with an almost perfect seal from an open condition at 50 p.s.i. differential, and opened from the closed condition at 45 p.s.i. Some hysteresis was caused by O ring flexure, but its effect on overall operation was not serious. Flow rate was changed ±50% without hysteresis while larger changes on open loop control produced about a 10% offset. This was well within the usable range for feedback control. Even on open loop, the overall drift at 1500 p.s.i. and 1000 ml./min. flow was only 10% per hour.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. The method of controlling the effective valve opening of a control valve having a movable element and wherein the movable element is capable of shifting in a first direction to a first end position and a second direction toward a travel limiting physical abutment located at a second end position; said method comprising biasing said element with a substantially constant force in said first direction towards said first end position where it engages a valve seat and is disposed in closurewise position over said valve opening and where movement of the element is restricted at said valve opening by said valve seat, generating an electrical current having a desired power level, transmitting said current to a solenoid coil to produce a magnetically generated force of desired magnitude, applying the magnetically generated force to said movable element tending to bias said element in said second direction towards said second end position and travel limiting physical abutment, controlling the lift-time history of the movable element in response to the magnitude and duration of the magentically generated force so that the maximum magnetically generated force is greater than said substantially constant force and that the average of the magnetically generated forces magnitude and duration is less than the substantially constant force to thereby cause a repetitive cycle of the movable element, which cycle comprises an opening period, a closing period and a quiescent period, such that during the opening period the movable element never contacts the travel limiting physical abutment, and during the quiescent period the movable element assumes a position of dynamic rest with simultaneous zero velocity and zero acceleration, whereby the time integral of the lift-time history of the movable element determines the effective valve opening.

2. The method of controlling the effective valve opening of claim 1 further characterized in that the substantially constant force biasing the movable element in the first direction is a mechanical force and that the lift-time history of the movable element is controlled by controlling the current-time history of the electrical current to the solenoid thereby causing the repetitive cycle of the movable element.

3. The method of controlling the effective valve opening of a control valve of claim 1 further characterized in that the generation of the electrical current is in the form of a series of electrical signals and the magnetically generated force is in the form of a series of successive force pulses.

4. The method of controlling the effective valve opening of a control valve of claim 3 further characterized in that the controlling of the lift-time history includes the controlling of the duration of said electrical current signals during generation thereof to produce a net unbalance of forces on said movable element tending to bias same to said second end position.

5. The method of claim 1 further characterized in that the effective valve opening and fluid flow therethrough is controlled in response to changes of a measured physical variable, and that the measured physical variable is sensed for changes thereof and the electrical current is generated in response to changes in the measured physical variable.

6. The method of claim 5 further characterized in that the physical variable is liquid level.

7. The method of controlling the effective valve opening of a control valve having a movable element and wherein the movable element is capable of shifting in a first direction to a first end position and a second direction toward a travel limiting physical abutment located at a second end position; said method comprising biasing said element with a substantially constant force in said first direction towards said first end position where it engages a valve seat and is disposed in closurewise position over said valve opening and where movement of the element is restricted at said valve opening by said valve seat, generating electrical current pulses, transmitting said current pulses to a solenoid coil to produce magnetically generated force pulses, applying the magnetically generated force pulses to said movable element tending to bias said element in said second direction towards said second end position and travel limiting physical abutment, controlling the lift-time history of the movable element for each pulse of the force pulses in accordance with the repetition rate of the force pulses and the maximum and the average magnitude of each force pulse whereby the movable element will shift toward the second end position for each force pulse in proportion to the maximum magnitude thereof to thereby cause a repetitive cycle of the movable element, which cycle comprises an opening period, a closing period and a quiescent period, such that during the opening period the movable element never contacts the travel limiting physical abutment, and during the quiescent period the movable element assumes a position of dynamic rest with simultaneous zero velocity and zero acceleration, whereby the time integral of the lift-time history of the movable element determines the effective valve opening.

References Cited

UNITED STATES PATENTS

| | | | |
|---|---|---|---|
| 2,843,147 | 7/1958 | Penther | 251—131 X |
| 3,231,002 | 1/1966 | Lehrer | 137—487.5 |
| 3,247,912 | 4/1966 | Reynolds | 251—129 |

FOREIGN PATENTS 1,019,565    1/1953    France.

LEE T. HIX, *Primary Examiner.*

U.S. Cl. X.R.

137—1; 251—129; 317—148.5